(12) United States Patent
Lachwani et al.

(10) Patent No.: US 8,738,952 B1
(45) Date of Patent: May 27, 2014

(54) DEVICE CONTROLLER LOW POWER MODE

(75) Inventors: Manish Lachwani, Sunnyvale, CA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 1094 days.

(21) Appl. No.: 12/749,203

(22) Filed: Mar. 29, 2010

(51) Int. Cl.
| G06F 1/00 | (2006.01) |
| G06F 1/26 | (2006.01) |
| G06F 1/32 | (2006.01) |
| G06F 13/00 | (2006.01) |
| G06F 13/24 | (2006.01) |

(52) U.S. Cl.
USPC ........... 713/324; 713/300; 713/320; 713/323; 710/100; 710/260

(58) Field of Classification Search
None
See application file for complete search history.

(56) References Cited

U.S. PATENT DOCUMENTS

| 6,622,178 B1* | 9/2003 | Burke et al. ............ 710/15 |
| 6,946,817 B2* | 9/2005 | Fischer et al. ............ 320/132 |
| 7,644,217 B2* | 1/2010 | Butler et al. ............ 710/302 |
| 7,818,589 B2* | 10/2010 | Watanabe ............ 713/300 |
| 8,078,893 B2* | 12/2011 | Umedu ............ 713/320 |
| 8,255,708 B1* | 8/2012 | Zhang ............ 713/300 |
| 2003/0005197 A1* | 1/2003 | Abramson et al. ............ 710/300 |
| 2003/0093702 A1* | 5/2003 | Luo et al. ............ 713/320 |
| 2004/0225832 A1* | 11/2004 | Huang ............ 711/105 |
| 2006/0053244 A1* | 3/2006 | Fruhauf et al. ............ 710/313 |
| 2009/0204965 A1* | 8/2009 | Tanaka et al. ............ 718/1 |
| 2010/0090644 A1* | 4/2010 | Nokkonen et al. ............ 320/107 |
| 2010/0205327 A1* | 8/2010 | Hamasaki ............ 710/16 |
| 2010/0241889 A1* | 9/2010 | Fu et al. ............ 713/324 |

OTHER PUBLICATIONS

Jay Trodden, "EHCI: Enhanced Host Controller Interface for USB 2.0", Sep. 10, 2001, Mindshare, Inc.*

* cited by examiner

*Primary Examiner* — Ji H Bae
(74) *Attorney, Agent, or Firm* — Lee & Hayes, PLLC

(57) ABSTRACT

A device controller, such as a universal serial bus ("USB") device controller, that is unattached to an external device is placed into a low power mode. During low power mode, interface components of the device controller are gated or placed into a reduced power state. For example, components such as a USB gadget PHY, which manages physical layer communication, USB direct memory access clock, secondary clocks, and so forth may be gated. Upon receiving a connection event indicating attachment of a device to the USB, the device controller resumes normal power operation. This device controller low power mode may work in conjunction with state retention modes or other low power modes affecting other components within an electronic device.

31 Claims, 6 Drawing Sheets

DEVICE CONTROLLER LOW POWER MODE

BACKGROUND

Electronic devices such as electronic book reader devices ("eBook reader devices"), cellular telephones, portable media players, desktop computers, laptops, tablet computers, netbooks, personal digital assistants, and the like, rely on electrical power to function.

Within these electronic devices, several components utilize power during operation, including the processor(s) and peripheral devices. These peripherals include external memory interfaces (EMIs), Universal Serial Bus (USB) host controllers, USB device controllers, image processing units (IPUs), and so forth. These peripherals may reside on the same "chip" or die as the processor, on another die, or a combination of same die and another die.

An idle device controller, such as on a USB interface, consumes power. This wastes energy and increases the amount of heat dissipated by the electronic device. Reducing power consumption increases the usable time for a portable device operating from a battery. Reducing power consumption also reduces the heat dissipated by the electronic device, allowing it to operate at a cooler temperature and thus increasing the life of the equipment and simplifying the cooling design.

Various schemes have been put forth to reduce power consumption in portable consumer devices by placing the processor of the device and certain peripherals into lower power modes. However, traditionally these schemes focus on reducing the power consumed by processors, memory, and so forth.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
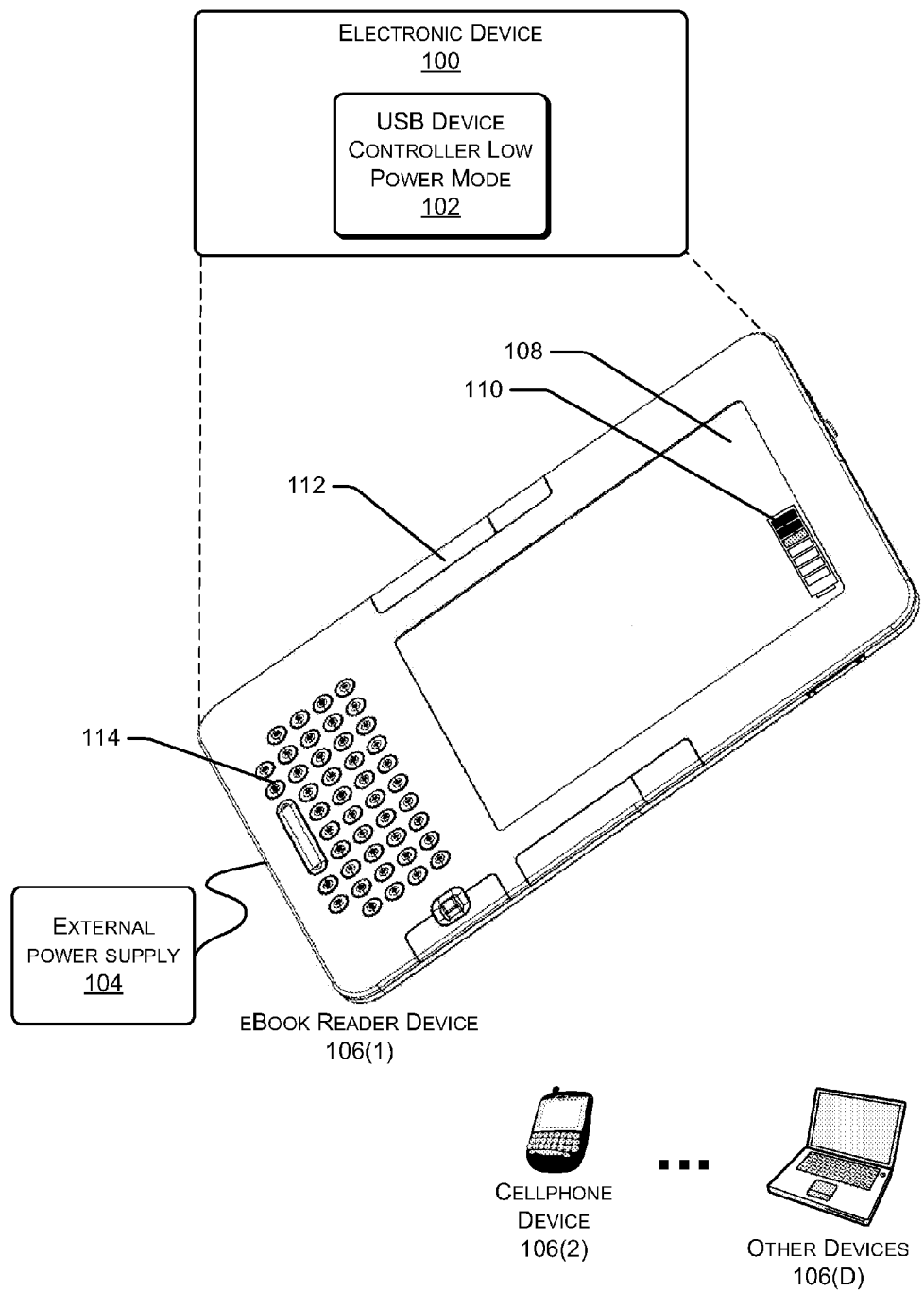
FIG. 1 is an illustrative eBook reader device with a universal serial bus ("USB") device controller configured to enter a USB device controller low power mode.

As described above, electronic devices utilize low power modes to reduce power consumption and heat dissipation. The electronic devices may be embodied as electronic book reader devices ("eBook reader devices"), cellular telephones, portable media players, desktop computers, laptops, tablet computers, netbooks, personal digital assistants, and the like. These devices use interfaces having device controllers to provide connectivity with external devices. For example, a USB interface may use a USB device controller to accept power from an external power supply for operation, charging, and so forth.

Reduction in energy requirements by devices is pursued, both to reduce overall energy usage, such as in desktops and servers, but also to extend the usable time of battery-powered devices such as eBook reader devices. One approach is to place the devices or portions thereof into lower power modes.

Existing low power modes do not adequately address interfaces, such as universal serial bus ("USB") interfaces and their associated device controllers. Traditionally, power consumption by active device controllers has been considered minimal relative to other high-consumption components, such as microprocessors and memory. However, given the desire to extract maximum battery life out of electronic devices, reduction in power consumption even among interfaces is an important aspect in managing power resources in electronic devices.

Furthermore, increasing data transfer speeds available on newer interfaces has led to increased power consumption by device controllers. For example, the USB 2.0 standard has a physical signaling rate of about 480 megabits per second (Mpbs), while the USB 3.0 standard permits transfers of up to about 4,000 Mbps. With this increased signaling rate comes increased power consumption. Even while not transferring data, such as when no device is attached to the USB, the interface components are still active and consuming power. Thus, reducing the power consumption of device controllers in interfaces, such as a USB device controller, has become worthwhile.

Described herein are techniques for placing a device controller and an associated component of an interface, such as a universal serial bus device controller, into a low power mode. Upon determining that no external device is attached to the interface, the low power mode is engaged and power consumption is reduced. Upon determining that an external device is attached to the interface, an awake operating mode is resumed. The interface quickly resumes normal awake operation without adverse latency.

This low power mode may be implemented by an electronic device utilizing an interface capable of gating clocks discretely and otherwise altering power states of the components within the interface. Gating is the ability to shutdown a selected portion or portions of a circuit. For example, the i.MX architecture with associated power management integrated circuit ("PMIC") from Freescale Semiconductor Incorporated, of Austin, Tex., United States of America, is one suitable family of devices. Another suitable architecture is the Open Multimedia Application platform ("OMAP") from Texas Instruments Inc., of Dallas, Tex., United States of America.

In the discussion that follows, reductions in power usage are expressed relative to that of the interface in active operation, such as when an interface is available to accept input, generate output, and so forth.

The interface may be coupled to a processor which executes an operating system, including, but not limited to, a Linux® operating system, a UNIX® operating system, Microsoft Corporation's Microsoft Windows® operating system, Microsoft Corporation's Windows Mobile® operating system, Apple Corporation's Mac OS® operating system, Apple Corporation's Mac OS X® operating system, and Wind River Systems Inc.'s VxWorks® operating system.

For example, an eBook reader device may incorporate a Freescale processor having an i.MX architecture and executing a Linux® kernel. The kernel uses device drivers to communicate with peripherals, such as external memory interfaces (EMIs), Universal Serial Bus (USB) device controllers, image processing units (IPUs), and so forth. These peripherals may reside on the same "chip" or die as the processor, as in the case of the i.MX architecture, be on another die, or a combination of the same die and another die.

Device drivers of an electronic device may communicate with the kernel of the device. The device drivers may include device controller drivers, drivers associated with the power management integrated circuit, enumeration drivers, and so forth.

The device may enter a USB device controller low power mode when no external device is attached to the universal serial bus (or "bus" hereinafter). The external device is considered attached to the device when the external device couples to the interface such that data, power, or both may be interchanged between the external device and the device controller.

This device controller low power mode may be applied to other device controllers in interfaces such as Ethernet, RS-232, Firewire, and so forth. Furthermore, the device controller low power mode may work in conjunction with doze, state retention, or other low power modes affecting other components within an electronic device. One such doze mode is discussed in pending U.S. patent application Ser. No. 12/261,980 filed Oct. 30, 2008 and entitled "Low Power Mode for Processor," incorporated herein by reference in its entirety.

While this overview describes the device controller low power mode in terms of an eBook reader device, the concepts described herein are also be applicable to cellular telephones, portable media players, desktop computers, laptops, tablet computers, netbooks, servers, personal digital assistants, or any other electronic devices.

Illustrative eBook Reader Device

FIG. 1 is an illustrative electronic device 100 configured to enter a USB device controller low power mode 102. Here, the electronic device 100 is shown coupled to an external power supply 104. As illustrated here, the external power supply 104 may provide power to the electronic device 100 via a USB connection. Several other electronic devices are shown in this illustration which may utilize the USB device controller low power mode 102. For example, electronic device 100 is shown embodied as a handheld, eBook reader device 106(1). FIG. 1 also illustrates that a cellphone device 106(2) and other devices 106(D), such as a netbook computer, may similarly utilize the USB device controller low power mode 102.

The eBook reader device 106(1) may have a display 108 to present content in a human-readable format to a user. The display 108 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 108 may take the form of electronic books or "eBooks". For example, the display 108 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 108 may further include touch screen capabilities that allow user input through contact or gesturing relative to the display. For convenience only, the display 108 is shown in a generally rectangular configuration. However, it is understood that the display 108 may be implemented in any shape, and may have any ratio of height to width. Also, for stylistic or design purposes, the display 108 may be curved or otherwise non-linearly shaped. Furthermore display 108 may be flexible and configured to fold or roll.

A battery state indicator 110, may also be presented on display 108. This indicator may be used to provide information to the user as to the power available within an onboard battery, charging status, and so forth. This information may be presented as a bar graph as shown here, or another representation.

The eBook reader device 106(1) may also incorporate one or more actuable controls 112, and a keypad 114 for user input. The one or more actuatable controls 112 may have dedicated or assigned operations. For instance, the actuatable controls 112 may include page turning buttons, a joystick, navigational keys, a power on/off button, selection keys, joystick, touchpad, and so on.

While one embodiment of electronic device 100 is shown in relation to an eBook reader device, it is understood that electronic device may instead comprises a cellular telephone 106(2) or one of multiple other devices 106(D), such as portable media players, desktop computers, laptops, tablet computers, netbooks, personal digital assistants, servers, and the like.

Figure 2:
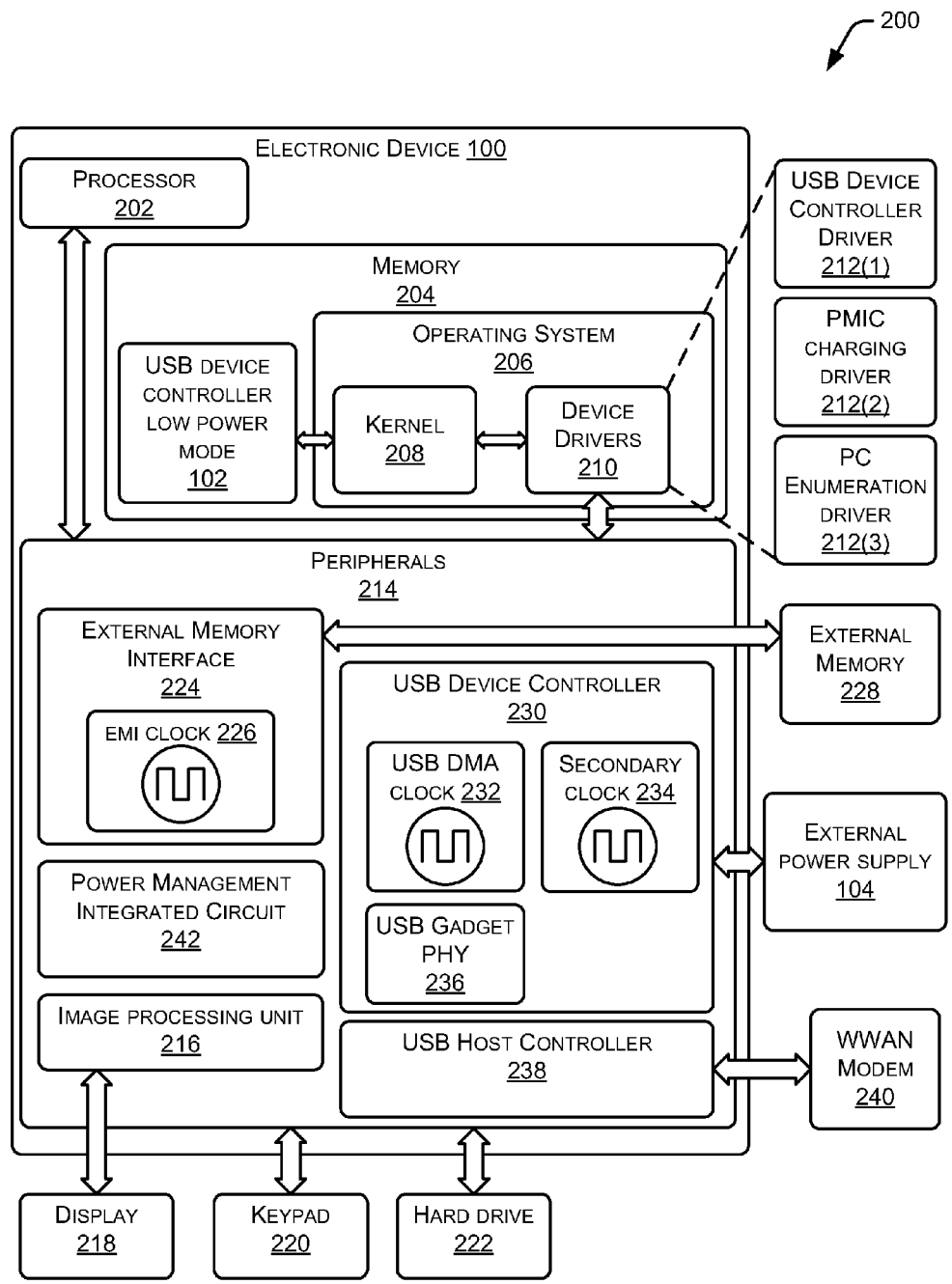
FIG. 2 is an illustrative schematic of an electronic device configured to enter the USB device controller low power mode.

FIG. 2 illustrates selected functional components 200 that might be implemented with the electronic device 100. In a very basic configuration, the device 100 includes components such as a processor 202 composed of one or more processors and memory 204. Depending on the configuration of a device 100, the memory 204 may be an example of computer readable storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the device 100.

The memory 204 may be used to store any number of functional components that are executable on the processing unit 202, as well as data including content items. Thus, the memory 204 may store an operating system 206 comprising a kernel 208. The kernel 208 may couple to the USB device controller low power mode module 102. The kernel 208 may also couple to one or more device drivers 210. These device drivers 210 may include a USB device controller driver 212(1), a power management integrated circuit charging driver 212(2), and a PC enumeration driver 212(3). The device drivers 212 couple to one or more peripherals 214. Several of the illustrative peripherals and components in electronic device 100 are described next.

FIG. 2 illustrates that an image processing unit 216 couples to a display 218. For example, this may be the display 108 shown forming a part of the eBook reader device 106(1) described with reference to FIG. 1 above. In some implementations, multiple displays may be present and coupled to one or more image processing units 216.

Electronic device 100 may have a keypad 220. For example, this may be the keypad 114 on the eBook reader device 106(1) described above having user actuable controls. FIG. also illustrate that the device may include a hard drive 222, which may either use magnetic or optical memory on spinning disks or solid state storage.

The electronic device 100 may also include an External Memory Interface ("EMI") 224, which comprises an EMI clock 226. The EMI 224 may couple to an external memory 228, which may comprise Static Random Access Memory ("SRAM"), Pseudostatic Random Access Memory ("PSRAM"), Synchronous Dynamic Random Access Memory ("SDRAM"), Double Data Rate SDRAM ("DDR"), NAND Flash, and so forth.

As illustrated, a USB device controller peripheral 230 may have several components, including a USB direct memory access ("DMA") clock 232, a secondary clock 234, and a USB gadget physical layer interface (PHY) 236. The USB DMA clock 232 provides timing signals used during direct memory access of the device controller. The secondary clock 234, such as USB_clk, provides timing signals for USB subsystem, including the device controller 230. In some implementations, the USB_clk may be derived from a parent PLL clock. Thus, the USB_clk may be gated after the parent PLL clock is gated. In other implementations and interfaces, some of these clocks may be omitted, while other clocks may be present.

The USB gadget PHY 236 provides a coupling between the physical layer (or "PHY") digital signals and modulated (analog) portion of the interface. The USB device controller 230 couples to an external device via the physical layer interface, and establishes a connection such with the external power supply 104 as shown.

FIG. 2 also illustrates a USB host controller 238, which is coupled to a WWAN modem 240. The USB device controller 230 and the host controller 238 may comply with any of the USB standards including USB 1.0, 1.1, 2.0, 3.0 as set forth by the USB Implementers Forum.

The electronic device 100 also includes a power management integrated circuit ("PMIC") 242. The PMIC 242, also known as a power management module, provides several functions including the ability to gate specific components, supply varying voltages to particular components, and so forth. In some implementations the PMIC may reside on the same "chip" or die as the processor 202, although it need not. The PMIC 242 is also configured to generate a notification or interrupt upon connection or disconnection of the external power supply 104. Upon connection, the PMIC 242 may be configured to allow power provided by the external power supply 104 to charge a battery within the device, provide operational power to the device, or both.

Other peripherals may be present in the electronic device 100. These other devices may include a firewire bus, camera, global positioning system, Bluetooth™ wireless interface, PC Card component, and so forth.

Couplings, such as those between the kernel 208, the device drivers 212 and the USB device controller low power mode module 102 are shown for emphasis. All devices in FIG. 2 are coupled, with their respective arrows omitted only for clarity of illustration.

Illustrative Processes for Entering USB Device Controller Low Power Mode

FIGS. 3-6 illustrate example processes 300, 400, 500, and 600 that may be implemented by the architecture described above with respect to FIGS. 1 and 2, or by other architectures. These processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. For ease of discussion, but not by way of limitation, the following figures include references to functions, commands, and/or other elements found in the Linux® operating system. It is understood that the following processes may be implemented on other operating systems as well.

Figure 3:
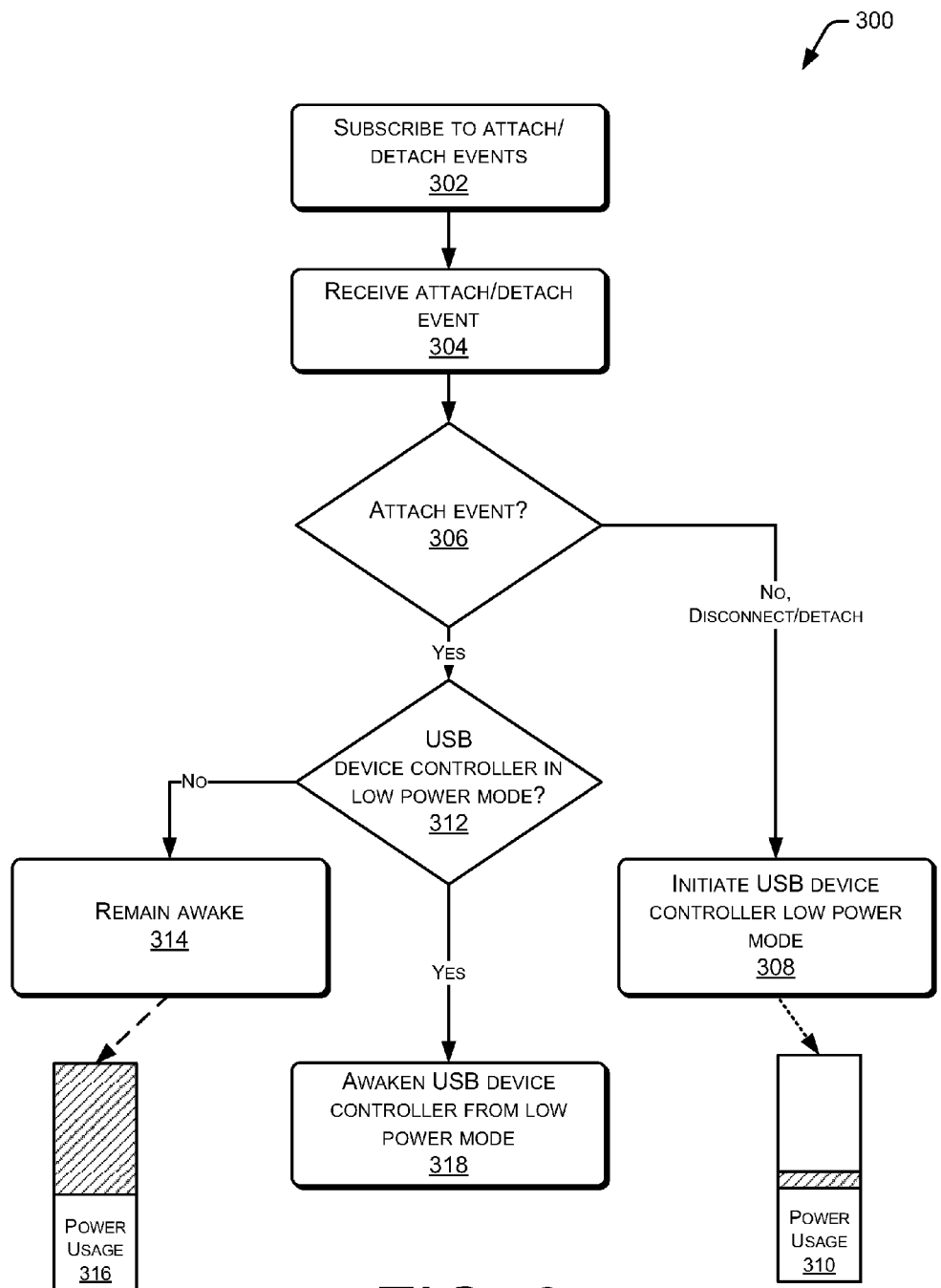
FIG. 3 is an illustrative flow diagram of a process for determining when to enter a USB device controller low power mode.

FIG. 3 is an illustrative flow diagram of a process 300 for determining when to enter a USB device controller low power mode. At 302, the PMIC charging driver 212(2) subscribes to receive attach/detach events, such as connect or disconnect event notifications from the PMIC 242 or USB On The Go (OTG) events. When the PMIC 242 detects a change in an attachment state of an external device, such as an external power supply 104 on an interface such as the USB, notifications are generated. Changes in the attachment state may also result upon attachment or detachment of other devices such as another computing device, camera, external hard drive, and so forth. Where USB On the Go (OTG) is supported, attachment to an external device may result in a wakeup from the USB device controller low power mode 102, while a detachment may result in entry into the USB device controller low power mode 102. Connected USB OTG devices may also send remote wakeups as well, triggering wakeup from the USB device controller low power mode 102. At 304, the USB device controller driver 212(1) receives this notification of an event such as attachment, detachment, connect, disconnect, or USB OTG wakeup.

At 306, a determination is made as to whether the notification is for an attach, connect, or wakeup event. The notification may be used, at least in part, to determine whether an external USB device is attached to the device controller 230. For example, when a disconnect event is received, the determination is that the external device is no longer attached to the device controller 230. Thus, when a disconnect event is received, it is determined that no USB device is attached to the device controller 230, and at 308 the USB device controller low power mode is initiated.

As shown by graph 310, power consumption by the device controller 230 and associated components in low power mode 102 is significantly reduced compared to the active mode. With some implementations on the Freescale architecture, power savings of about 35 milliamps (mA) may be achieved, although other levels of power savings may result in other implementations. Compared to active mode currents of about 40 mA or more, this results in an over 87% reduction in power consumption in some instances. Initiation of the low power mode 102 is discussed below with regards to FIG. 4.

When a USB device is determined to be attached or connected to the device controller 230 or a USB OTG wakeup event was received at 306, another determination is made as to whether the USB device controller 230 is in the low power mode 102 at 312. In some implementations this is determined by comparing a state indicator value which is set upon entry, exit, or both, of the low power mode 102.

When it is determined at 312 that the USB device controller 230 is not in low power mode 102, the device controller 230 remains awake at 314. As shown by graph 316, power usage of the device controller 230 may be at 100% while awake. As mentioned above, while the device controller 230 remains awake (without regard as to whether the controller is actually transferring data), the device controller 230 may consume about 40 mA or more. By placing the device controller 230 into a low power mode 102, this current consumption is significantly reduced.

When the device controller 230 is determined to be in low power mode 102 at 312, the device controller 230 and associated components are awakened from the low power mode 102 at 318 to resume normal operation. With respect to the Freescale architecture, wakeup latency may be about 20 milliseconds (ms). Thus, the external device which was determined to be attached above at 306 may quickly begin functioning Awakening the device controller 230 is discussed in more detail below with regards to FIG. 5.

Figure 4:
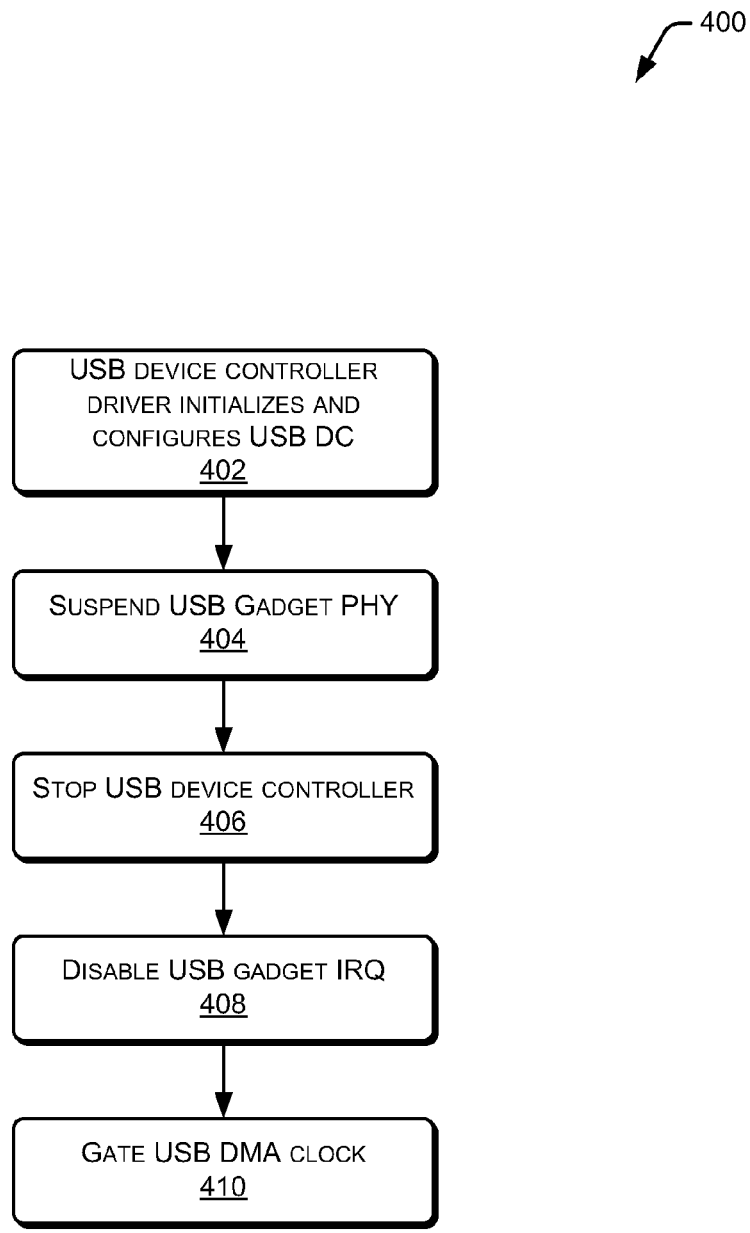
FIG. 4 is an illustrative flow diagram of a process for entering a USB device controller low power mode.

FIG. 4 is an illustrative flow diagram of a process 400 for entering a USB device controller low power mode 102, such as after receiving a disconnect event from the PMIC charging driver 212(2). At 402, the USB device controller driver 212(1) initializes and configures the USB device controller 230.

At 404, the USB gadget PHY 236 is suspended. The USB gadget PHY 236 is connected to the device controller 230 and handles the physical layer interface with attached external devices. With regards to the Freescale architecture, this may be done by setting a PORTSC register as defined within the "MCIMX31 and MCIMX31L Applications Processors Reference Manual," §32.9.5.9.2 as published by Freescale Semiconductor, Inc. The USB gadget PHY 236 may be internal or external to the USB device controller 230. When the USB gadget PHY is internal, after suspension the USB gadget PHY 236 may be disabled.

In some implementations a delay may be inserted into the process to allow time for components at the physical layer time to settle. For example, when the USB gadget PHY 236 is internal to the device controller 230, delays of between about 9 and 30 milliseconds are suitable, with a delay of about 20 milliseconds being preferred. When the USB gadget PHY is external to the device controller 230, longer delays may be required. Implementations using an external USB gadget PHY may require increased delay due to longer settling times. Also, the external USB gadget PHY may require an explicit reset upon wakeup/resume. In contrast, the internal USB gadget PHY 236 may be disabled once suspended. The internal USB gadget PHY 236 may comprise a USB 2.0 transceiver macrocell interface (UTMI), a serial, or a UTMI plus low pin interface (ULPI).

Within the Freescale architecture, power savings of about 12 mA may be achieved from suspension of the USB gadget PHY 236, although other implementations may realize more or less power savings.

At 406, the USB device controller 230 is stopped. With regards to the Freescale architecture, this may be done using a USBCMD register as defined within the "MCIMX31 and MCIMX31L Applications Processors Reference Manual," §32.9.5.1 as published by Freescale Semiconductor, Inc. Within the Freescale architecture, power reductions of about 13 mA may be achieved from stopping the USB device controller 230, although other implementations may realize more or less power savings.

As with the USB gadget PHY 236, the device controller 230 circuitry benefits in some implementations from introducing a delay to allow circuitry to settle. In some implementations, delays of between about 10 and 30 milliseconds are suitable, with a delay of about 20 milliseconds being preferred.

At 408, the USB gadget interrupt requests for USB gadget PHY 236 are disabled. Among other purposes, this serves to notify components within the upper stack of the USB interface that the physical layer has been suspended. Because one wakeup source is a connection detection interrupt from the PMIC 232, disabling these interrupts does not adversely affect later resumption of normal operation. USB OTG wakeups may also act as a wakeup source. In such an implementation, an OTG wakeup is enabled on an OTG controller and the gadget port is configured as OTG. Once configured, connection of an external device to the OTG port results in a wakeup, waking the USB stack.

At 410, the USB DMA clock 232 is suspended. Within the Freescale architecture, power reductions of about 10 mA may be achieved as a result of suspending the DMA clock 232, although other implementations may realize more or less power savings. Furthermore, once the DMA clock 232 has been gated, it becomes possible to gate the EMI clock 226. Gating the EMI clock 226 may be done in conjunction with other low power modes, such as the doze mode discussed in pending U.S. patent application Ser. No. 12/261,980 filed Oct. 30, 2008 and entitled "Low Power Mode for Processor," incorporated herein by reference in its entirety.

Figure 5:
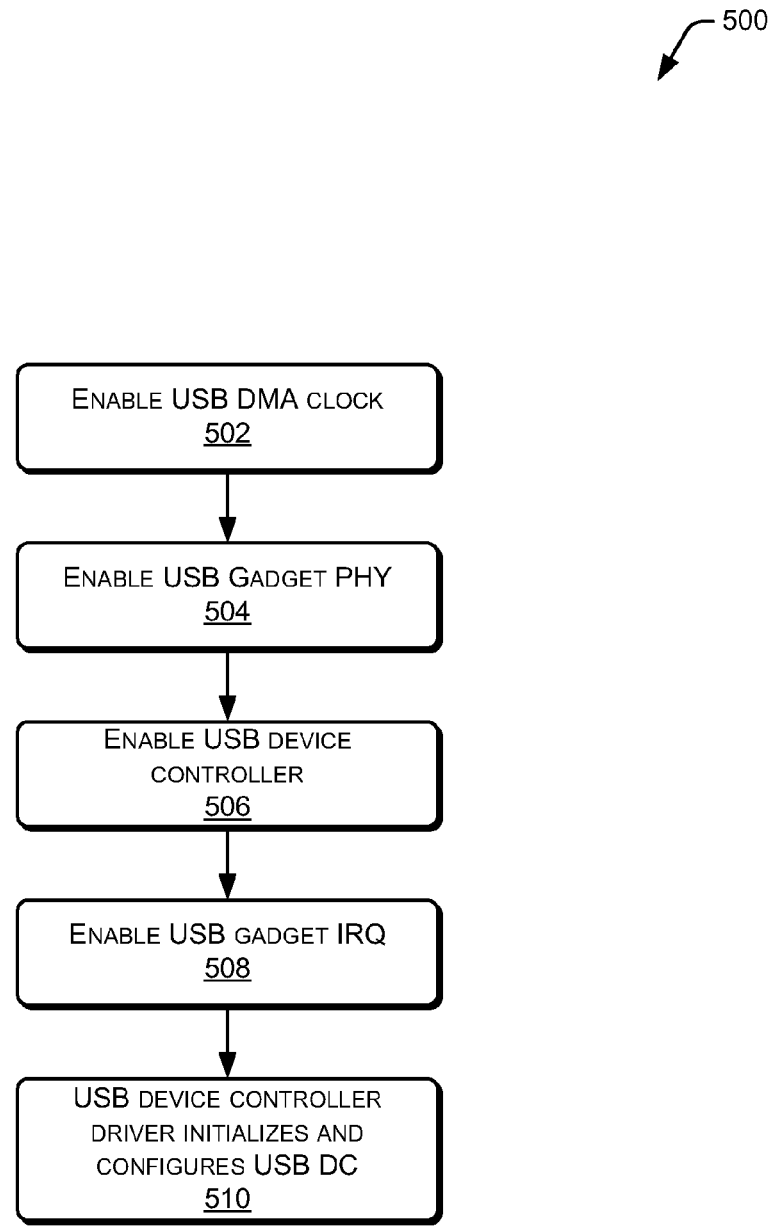
FIG. 5 is an illustrative flow diagram of a process for awakening a USB device controller from the low power mode of FIG. 4.

FIG. 5 is an illustrative flow diagram of a process 500 for awakening a USB device controller from the low power mode 102 of FIG. 4. Awakening occurs when the device controller has previously been placed in low power mode 102 and after receiving a connect event from the PMIC charging driver 212(2).

At 502, the USB DMA clock 232 is enabled. A delay after enabling may be introduced to allow time for the clock to settle into an operative state. With clock signals now available, the internal USB gadget PHY 236 may be enabled or an external USB gadget PHY may be reset at 504. At 506, the USB device controller is enabled, while the USB gadget IRQ is enabled at 508. Finally, the USB device controller driver 212(1) is initialized and configures the USB device controller 230 for operation at 510. Fully awake, the device controller 230 is now operational.

Figure 6:
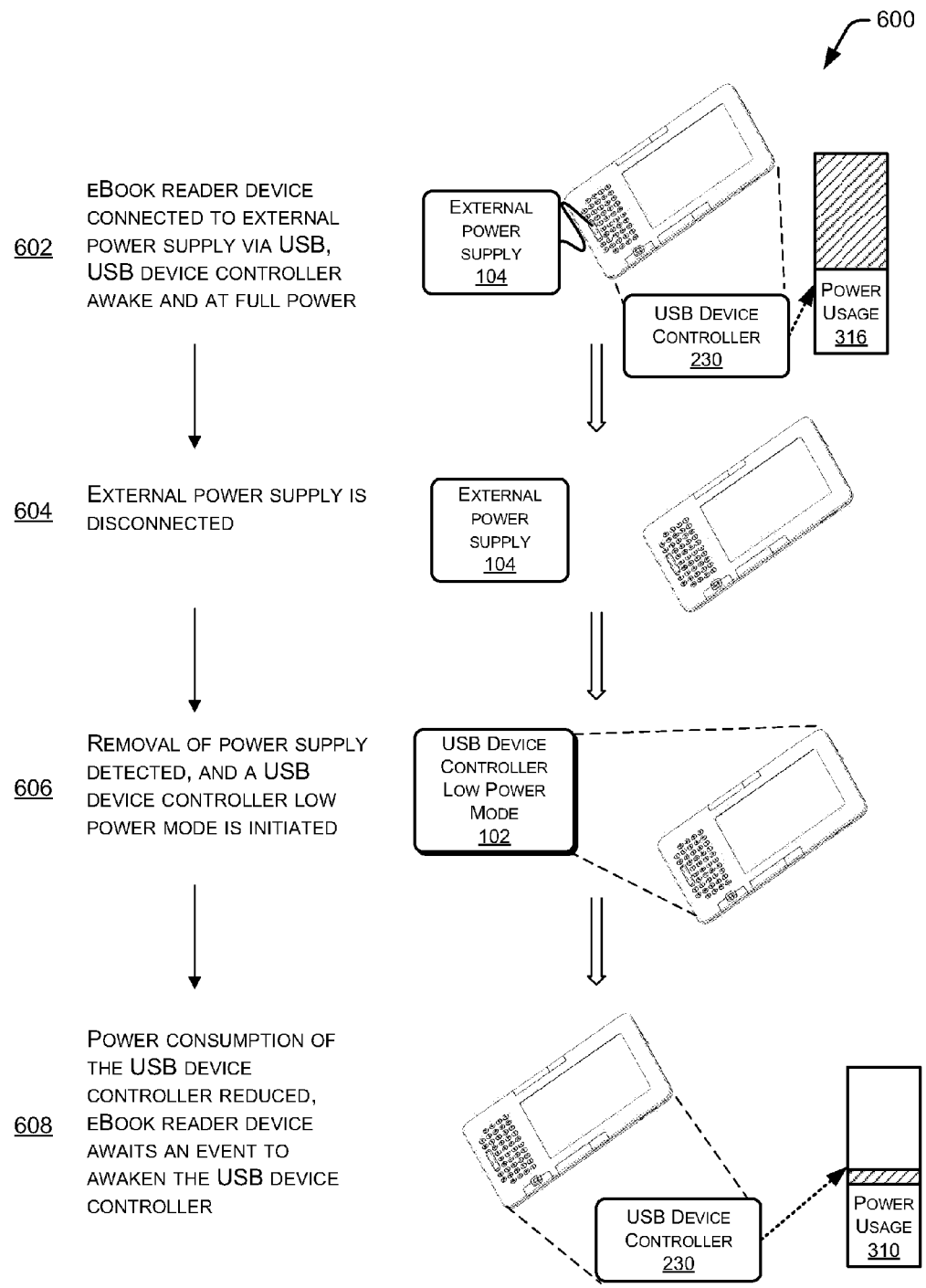
FIG. 6 is an illustrative flow diagram of an eBook reader device entering the USB device controller low power mode of FIG. 4.

FIG. 6 is an illustrative flow diagram 600 of an eBook reader device entering the USB device controller low power mode of FIG. 4. Operation 602 shows an eBook reader device 106(1) connected to an external power supply 104 via a USB interface. The external power supply 104 is providing power to the eBook reader device 106(1) for operation, charging, or both via a charging cable into the USB connection. A USB device controller 230, to which the charging cable is connected, is awake and fully active. Thus, the power usage of the device controller 230 is high.

Operation 604 shows disconnecting the external power supply 104 from the eBook reader device 106(1). Operation 606 depicts that upon removal from a USB interface, the removal is detected. Because no external device is connected to the USB interface, a low power mode 102 for the device controller 230 is be initiated.

Operation 608 shows that power consumption of the USB device controller is reduced significantly now that the device controller 230 and associated components have entered the low power mode 102. The eBook reader device 106(1) maintains the interface in the low power mode 102 until an event awakens the device controller. Events which awaken the device controller include during device startup (booting), connection event, resumption from a state retention mode, and so forth. Once awakened, normal operation of the interface may take place.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method for placing a universal serial bus (USB) device controller associated with a USB into a low power mode, the method comprising:
performing, by a handheld electronic device that is peripheral to a host device:
receiving a disconnect event indicating that the host device has been disconnected from the USB; and
at least partly in response to receiving the disconnect event:
suspending a USB physical layer interface, and
initiating the low power mode for the USB device controller.

2. The method of claim 1, further comprising:
subscribing, by a device driver, to connect and disconnect events generated by a power management integrated circuit of the handheld electronic device, wherein the device driver receives the disconnect event;
detecting, by the power management integrated circuit, the host device disconnecting from the USB; and
sending, by the power management integrated circuit, the disconnect event to the device driver.

3. The method of claim 1, further comprising disabling the USB physical layer interface based on the USB physical layer interface being internal to the USB device controller.

4. The method of claim 1, further comprising disabling a USB gadget interrupt request (IRQ).

5. The method of claim 1, further comprising gating a USB direct memory access (DMA) clock.

6. The method of claim 1, further comprising gating a secondary clock.

7. The method of claim 5, further comprising gating an external memory interface (EMI) clock after gating the USB DMA clock.

8. The method of claim 1, wherein the initiating the low power mode for the USB device controller comprises setting a USB Command (USBCMD) register.

9. The method of claim 1, wherein the USB physical layer interface, a USB On The Go physical layer interface, or both are suspended before the initiating the low power mode for the USB device controller.

10. The method of claim 1, wherein a power management integrated circuit generates a connection or disconnection event upon connection or disconnection of the handheld electronic device to an external power supply of the host device.

11. The method of claim 1, wherein a power management integrated circuit generates a connection or disconnection event upon connection or disconnection of a USB On The Go device.

12. A method for awakening a universal serial bus (USB) device controller associated with a USB from a low power mode, the method comprising:
detecting, by a device component, a connection event while the USB device controller is in the low power mode, wherein the device component is distinct from the USB device controller, and the device component is active while the USB device controller is in the low power mode; and
at least partly in response to detecting the connection event:
enabling a USB physical layer interface;
enabling the USB device controller; and
initializing a USB device controller driver.

13. The method of claim 12, wherein the connection event indicates a connection of an external device to the USB.

14. The method of claim 12, further comprising enabling a USB direct memory access (DMA) clock.

15. The method of claim 12, further comprising resetting the USB physical layer interface based on a USB gadget physical layer interface being external to the USB device controller.

16. The method of claim 12, further comprising enabling an external memory interface (EMI) clock before the enabling of a USB direct memory access (DMA) clock.

17. One or more non-transitory, computer-readable storage media storing instructions that, when executed by one or more processors, cause the one or more processors to perform acts comprising:
determining by a device component that a device controller couples or decouples with an external device, wherein the device component is distinct from the device controller;
upon determining by the device component that the device controller has decoupled with the external device, and at least partly based on the device controller being in an active mode:
suspending a physical layer interface, and
stopping the device controller; and
upon determining by the device component that the device controller has coupled with the external device, and at least partly based on the device controller being in a low power mode:
enabling the physical layer interface,
enabling a physical layer interrupt request,
enabling the device controller, and
initializing a device controller driver associated with the device controller.

18. The one or more non-transitory, computer-readable media of claim 17, further comprising upon determining that the device controller has decoupled with the external device, and at least partly based on the device controller being in the active mode, disabling the physical layer interrupt request (IRQ).

19. The one or more non-transitory, computer-readable media of claim 17, further comprising upon determining that the device controller has decoupled with the external device, and at least partly based on the device controller being in the active mode, gating a direct memory access (DMA) clock associated with the device controller.

20. The one or more non-transitory, computer-readable media of claim 17, further comprising upon determining that the device controller has coupled with the external device, and least partly based on the device controller being in the low power mode, enabling a direct memory access (DMA) clock associated with the device controller.

21. The one or more non-transitory, computer-readable media of claim 17, wherein the determining that the device controller couples or decouples with the external device is based at least in part on receiving of an event from a power management device.

22. The one or more non-transitory, computer-readable media of claim 21, wherein the event from the power management device comprises a charger detect interrupt.

23. The one or more non-transitory, computer-readable media of claim 17, wherein the external device comprises a power supply, external hard drive, or external host computing device.

24. An electronic device comprising:
memory;
at least one processor coupled to the memory;
a device component coupled to the at least one processor and configured to:
control charging of the electronic device,
detect an external device being connected to the electronic device, and
notify a device driver at least partly in response to detecting the external device being connected;
the device driver stored in the memory and configured to execute on the at least one processor, the device driver configured to:
subscribe to receive connect or disconnect events from the device component,
receive a notification of a disconnect event from the device component, and
initiate a low power mode for a device controller in response to receiving the notification from the device component; and
the device controller being configured to:
enter the low power mode at least partly in response to the device driver initiating the low power mode.

25. The electronic device of claim 24, wherein the connect or disconnect events are generated as a result of a connection or a disconnection of the external device with the electronic device.

26. The electronic device of claim 24, wherein the device component is further configured to:
generate a plurality of notifications corresponding to respective connect or disconnect events for a plurality of external devices, wherein a particular notification of the plurality of notifications indicates that the external device has been disconnected from the electronic device.

27. The electronic device of claim 24, wherein to initiate the low power mode, the device driver is further configured to:
disable a physical layer interface associated with the device controller;
disable the device controller;
disable interrupt requests associated with the physical layer interface; and
gate a direct memory access (DMA) clock associated with the device controller.

28. The electronic device of claim 27, wherein the device driver is further configured to cause a delay between the disabling of the physical layer interface and the disabling of the device controller, the delay being at least about 9 milliseconds.

29. The electronic device of claim 27, wherein the device driver is further configured to cause a delay between the disabling of the device controller and the disabling of the interrupt requests, the delay being between about 10 milliseconds and 30 milliseconds.

30. The electronic device of claim 27, wherein the device driver is further configured to gate a secondary device clock.

31. The electronic device of claim 24, wherein the electronic device comprises an electronic book reader device.

\* \* \* \* \*